United States Patent
Mangla et al.

(10) Patent No.: US 11,508,165 B2
(45) Date of Patent: *Nov. 22, 2022

(54) DIGITAL MIRROR SYSTEMS FOR VEHICLES AND METHODS OF OPERATING THE SAME

(71) Applicant: TEXAS INSTRUMENTS INCORPORATED, Dallas, TX (US)

(72) Inventors: Mayank Mangla, Allen, TX (US); Shashank Dabral, Allen, TX (US)

(73) Assignee: Texas Instmments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,958

(22) Filed: Nov. 2, 2020

(65) Prior Publication Data

US 2021/0049389 A1   Feb. 18, 2021

Related U.S. Application Data

(63) Continuation of application No. 15/852,837, filed on Dec. 22, 2017, now Pat. No. 10,872,254.

(51) Int. Cl.
*G06V 20/59* (2022.01)
*G06T 7/11* (2017.01)
(Continued)

(52) U.S. Cl.
CPC ............ *G06V 20/597* (2022.01); *B60K 35/00* (2013.01); *B60R 1/00* (2013.01); *B60R 11/04* (2013.01);
(Continued)

(58) Field of Classification Search
None
See application file for complete search history.

(56) References Cited

U.S. PATENT DOCUMENTS 6,424,272 B1   7/2002   Gutta et al.
8,238,695 B1   8/2012   Davey et al.
(Continued)

FOREIGN PATENT DOCUMENTS

EP    2743133 A2    6/2014
WO   2014130049 A1   8/2014

OTHER PUBLICATIONS

"TDA3x SoC for Advanced Driver Assistance Systems (ADAS)—Technical Reference Manual", published by Texas Instruments, in Oct. 2017, 6651 pages.
FotoNation, "FotoNation Automotive", published online at: http://www.fotonation.com/products/automotive/, downloaded on Dec. 7, 2017, 8 pages.

*Primary Examiner* — Gelek W Topgyal
(74) *Attorney, Agent, or Firm* — Carl G. Peterson; Charles A. Brill; Frank D. Cimino (57) ABSTRACT

Digital mirror systems for vehicles and methods of operating the same are disclosed. An example vehicle control system includes: a driver monitoring system including a head position determiner to determine at least one of a location of a head, an orientation of the head, or an eye gaze point of the head; a digital mirror system including a region-of-interest (ROI) detector to identify an ROI based on the at least one of the location of the head, the orientation of the head, or the eye gaze point of the head, and a cropper to extract a portion of a first image corresponding to the ROI to form a second image, the first image representing an area exterior to the vehicle; and a display within an interior area of the vehicle to present the second image.

20 Claims, 6 Drawing Sheets

(51) Int. Cl.
*B60R 11/04* (2006.01)
*B60K 35/00* (2006.01)
*G08G 1/16* (2006.01)
*B60R 1/00* (2022.01)
*G06V 20/56* (2022.01)
*B60R 11/00* (2006.01)
*B60R 1/12* (2006.01)

(52) U.S. Cl.
CPC .............. *G06T 7/11* (2017.01); *G06V 20/588* (2022.01); *G08G 1/167* (2013.01); *B60K 2370/152* (2019.05); *B60K 2370/186* (2019.05); *B60R 2001/1253* (2013.01); *B60R 2011/004* (2013.01); *B60R 2300/105* (2013.01); *B60R 2300/307* (2013.01); *B60R 2300/40* (2013.01); *B60R 2300/804* (2013.01); *G06T 2207/30252* (2013.01); *G06T 2207/30268* (2013.01)

(56) References Cited

U.S. PATENT DOCUMENTS

| | | |
|---|---|---|
| 9,764,694 B2 | 9/2017 | Ding |
| 10,043,083 B2 | 8/2018 | Ding |
| 2008/0266552 A1 | 10/2008 | Malawey et al. |
| 2009/0022368 A1 | 1/2009 | Matsuoka et al. |
| 2012/0154591 A1* | 6/2012 | Baur .................... B60R 1/00 348/148 |
| 2013/0038732 A1 | 2/2013 | Waite et al. |
| 2014/0348389 A1 | 11/2014 | Graumann |
| 2014/0354798 A1 | 12/2014 | Galarraga |
| 2016/0272215 A1 | 9/2016 | Laine |
| 2017/0336797 A1 | 11/2017 | Abe et al. |
| 2018/0015879 A1 | 1/2018 | Kim |

* cited by examiner

DIGITAL MIRROR SYSTEMS FOR VEHICLES AND METHODS OF OPERATING THE SAME

CROSS-REFERENCE TO RELATED APPLICATIONS

This application is a continuation of U.S. patent application Ser. No. 15/852,837 filed on Dec. 22, 2017, which is incorporated by reference herein in its entirety.

FIELD OF THE DISCLOSURE

This disclosure relates generally to vehicles, and, more particularly, to digital mirror systems for vehicles and methods of operating the same.

BACKGROUND

A digital mirror system (e.g., a camera monitoring system) for a vehicle is a system that replaces and/or augments the optical mirror(s) of the vehicle. An example digital mirror system includes a camera on the exterior of a vehicle that streams images to one or more displays mounted inside the vehicle.

Wherever beneficial, the same reference numbers will be used throughout the drawing(s) and accompanying written description to refer to the same or like parts. Connecting lines or connectors shown in the various figures presented are intended to represent example functional relationships, physical and/or logical connections and/or communications between the various elements.

DETAILED DESCRIPTION

Digital mirror systems are becoming popular in modern vehicles such as automobiles because they are more aerodynamic, provide better visibility, etc. than conventional optical mirrors. However, there are disadvantages of such digital mirror systems. For example, with an optical mirror, the occupant of the vehicle can change what they are seeing by moving their head and/or eyes. However, with known digital mirror systems, the view is fixed because the mounting of the exterior camera is fixed and, does not adapt with an occupant's movement. This prevents known digital mirror systems from providing the natural look and feel provided by optical mirrors.

To overcome at least these deficiencies, some example digital mirror systems disclosed herein monitor, for example, location of an occupant's head, orientation of the head, eye gaze point of the head (e.g., direction occupant's eyes are pointed), etc., and use this positional information to control the view(s) presented by a vehicle's digital camera system. In some examples, an interior camera (i.e., within an interior portion, interior area, interior space, etc.) is used to monitor, for example, the location of the occupant's head, orientation of the head, eye gaze point of the head, etc. The view(s) can be changed digitally and/or mechanically. In some examples, the view presented by a digital mirror system is adapted to be consistent with the occupant's head and/or eye movements. In some examples, there are more than one digital mirror in a vehicle, and the camera(s) associated with the digital mirror(s) being looked at are adapted. In some such examples, the view changes only for the digital mirror the occupant is gazing at. However, when two digital mirrors (e.g., a normal mirror directly below a wide-angle mirror for a vehicle), they may be changed at the same time. In some examples, location of an occupant's head, orientation of the head, eye gaze point of the head (e.g., direction occupant's eyes are pointed), etc. are used to identify occupants and automatically adapt the digital mirror system 120 to different drivers sharing the same vehicle at different times. In some examples, small unintentional movements (which may be unintentional due to vehicle movements, e.g., hitting a bump, etc.) do not cause the view to change. Example vehicles which may benefit from one or more of the digital mirrors disclosed herein include, but are not limited to, a bicycle, a motorcycle, a car, a bus, a train, a boat, an airplane, etc. Example occupants of such vehicles include, but are not limited to an operator, a non-operator, a driver, a rider, a passenger, an engineer, a pilot, etc. While examples disclosed herein are described in connection with vehicles, the teachings of this disclosure also apply to non-vehicular environments, such as buildings, etc.

Reference will now be made in detail to non-limiting examples, some of which are illustrated in the accompanying drawings.

Figure 1:
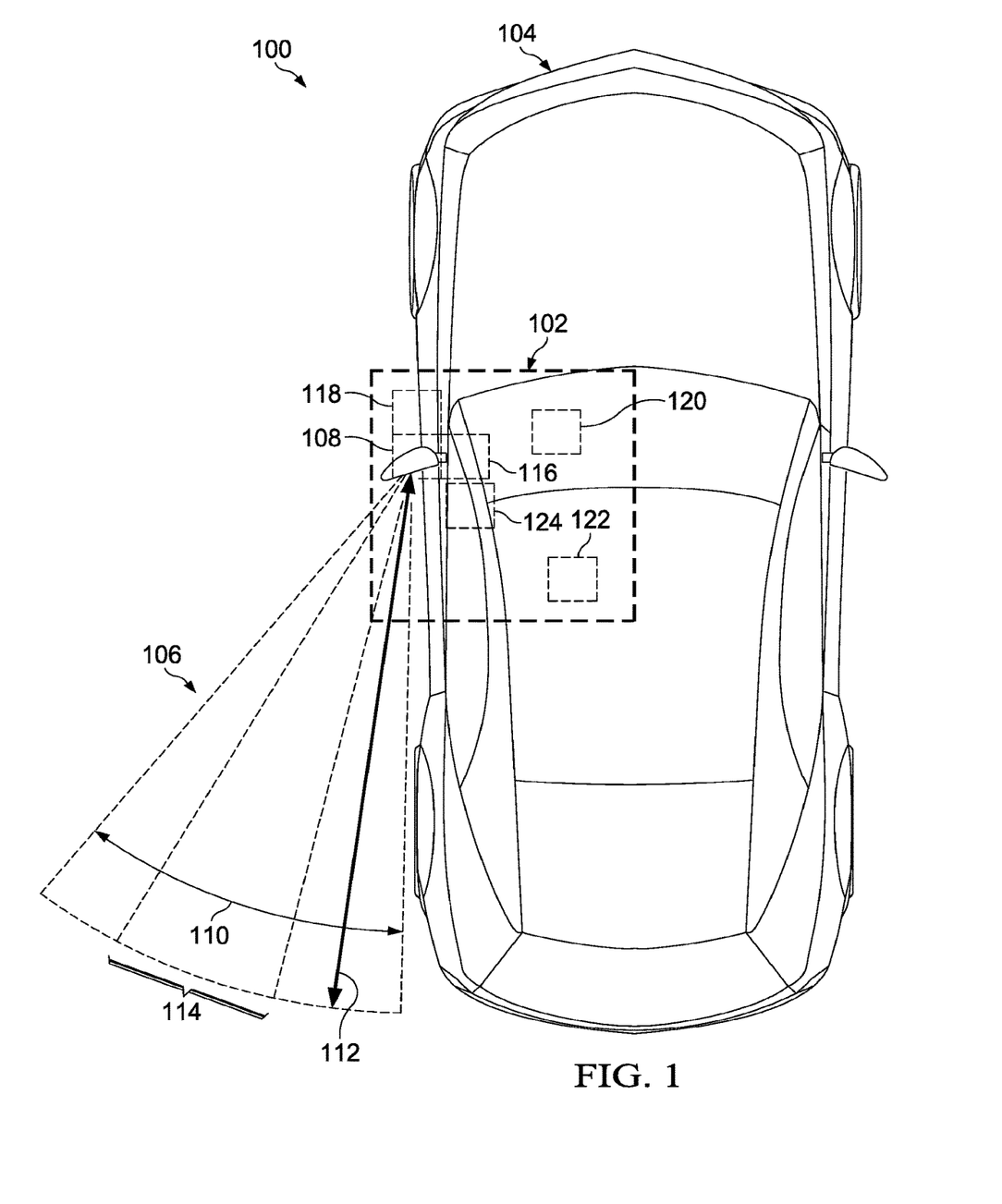
FIG. 1 illustrates an example vehicle control system constructed in accordance with teachings of this disclosure, and shown in an example environment of use.

FIG. 1 illustrates an example environment 100 in which an example vehicle control system 102 constructed in accordance with teachings of this disclosure is implemented in an example vehicle 104. In this example, the vehicle 104 is a car. To capture images of an example area 106 exterior to the car 104, the example vehicle control system 102 includes an example exterior camera 108. The example exterior camera 108 may be implemented by any type of camera, and may be mounted in any way to capture images of the example area 106 outside the vehicle. For example, the camera 108 can be mounted exterior to the car 104, can be mounted partially within the car 104, can be mounted on an interior surface of the car 104, etc. A disclosed example exterior camera 108 has a range 112 of 20 meters (m), a resolution of 1920 pixels per row, and includes a lens 202 (see FIG. 2) that provides a field of view (FOV) 110 of 80 degrees. A known digital mirror system camera has a range of 20 m, a resolution of 1280 pixels per row, and includes a lens (not shown) that provides a FOV of 60 degrees. The increased FOV provided by the lens 202, and the increased resolution of the disclosed camera 108 provides additional pixels for pan/tilt/rotate operations (e.g., allowing an occupant to set their mirror location) and blind spot algorithms. The increased FOV and increased resolution of the disclosed camera 108 additionally, and/or alternatively, enable different portions (one of which is designated at reference numeral 110) of the area 106 to be presented while maintaining enough pixels within the portion 110 to meet and/or exceed the pixel density requirements for digital mirror systems set by, for example, industry standards, government regulations, etc.

To display images captured by the example exterior camera 108, the example vehicle control system 102 includes any number and/or type(s) of example displays, one of which is designated at reference numeral 116. The example display 116 can be implemented anywhere within the car 104. For example, at a location where an occupant can readily view the display 116 (e.g., near where a side view optical mirror would typically be mounted) while interacting with the vehicle control system 102.

In the illustrated example, the exterior camera 108 captures an image of the entire area 106. To determine the portion 114 of the area 106 to present at the display 116, the example vehicle control system 102 includes a driver monitoring system 118. The example driver monitoring system 118 processes data representing head location of the occupant's head, orientation of the head, eye gaze point of the head, etc. to determine the portion 114 that the occupant is intending to view. In some examples, the portion 114 can be moved left-and-right and up-and-down within the area 106 based on, for example, head location of the occupant's head, orientation of the head, eye gaze point of the head, etc. Thus, although FIG. 1 illustrates a particular position of the area 114 relative to the area 106 imaged by the exterior camera 108, the area 114 can be moved relative to the area 106. Based on the portion 114 of area 106 determined by the driver monitoring system 118 to be of interest, an example digital mirror system 120 crops the image captured by the exterior camera 108 to just the portion 114 of interest. Example implementations of the example driver monitoring system 118 and the example digital mirror system 120 are disclosed below in connection with FIG. 2.

To determine the position, angle, eye gaze, etc. of the occupant's head 122, the example vehicle control system 102 includes any number and/or type(s) of example interior cameras, one of which is designated at reference numeral 124. The example interior camera 124 may be implemented by one or more of an illuminated near infrared camera, a visible light camera, a color camera, a black and white camera, etc. The interior camera 124 can be mounted anywhere within the car 104. For example, the interior camera 124 may be positioned at a location where an occupant's head would naturally be positioned when driving the vehicle (e.g., near where a side view optical mirror would be typically mounted).

While an example vehicle control system 102 is illustrated in FIG. 1, one or more of the elements, processes and/or devices illustrated in FIG. 1 may be combined, divided, re-arranged, omitted, eliminated and/or implemented in any other way. Further, the example exterior camera 108, the example display 116, the example driver monitoring system 118, the example digital mirror system 120, example interior camera 124, and/or, more generally, the example vehicle control system 102 of FIG. 1 may be implemented by hardware, software, firmware and/or any combination of hardware, software and/or firmware. Thus, for example, any of the example exterior camera 108, the example display 116, the example driver monitoring system 118, the example digital mirror system 120, example interior camera 124, and/or, more generally, the example vehicle control system 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example exterior camera 108, the example display 116, the example driver monitoring system 118, the example digital mirror system 120, example interior camera 124, and/or, more generally, the example vehicle control system 102 is/are hereby expressly defined to include a non-transitory computer readable storage device or storage disk such as a memory, a digital versatile disk (DVD), a compact disc (CD), a Blu-ray disk, etc. including the software and/or firmware. Further still, the example vehicle control system 102 of FIG. 1 may include one or more elements, processes and/or devices in addition to, or instead of, those illustrated in FIG. 1, and/or may include more than one of any or all the illustrated elements, processes and devices.

Figure 2:
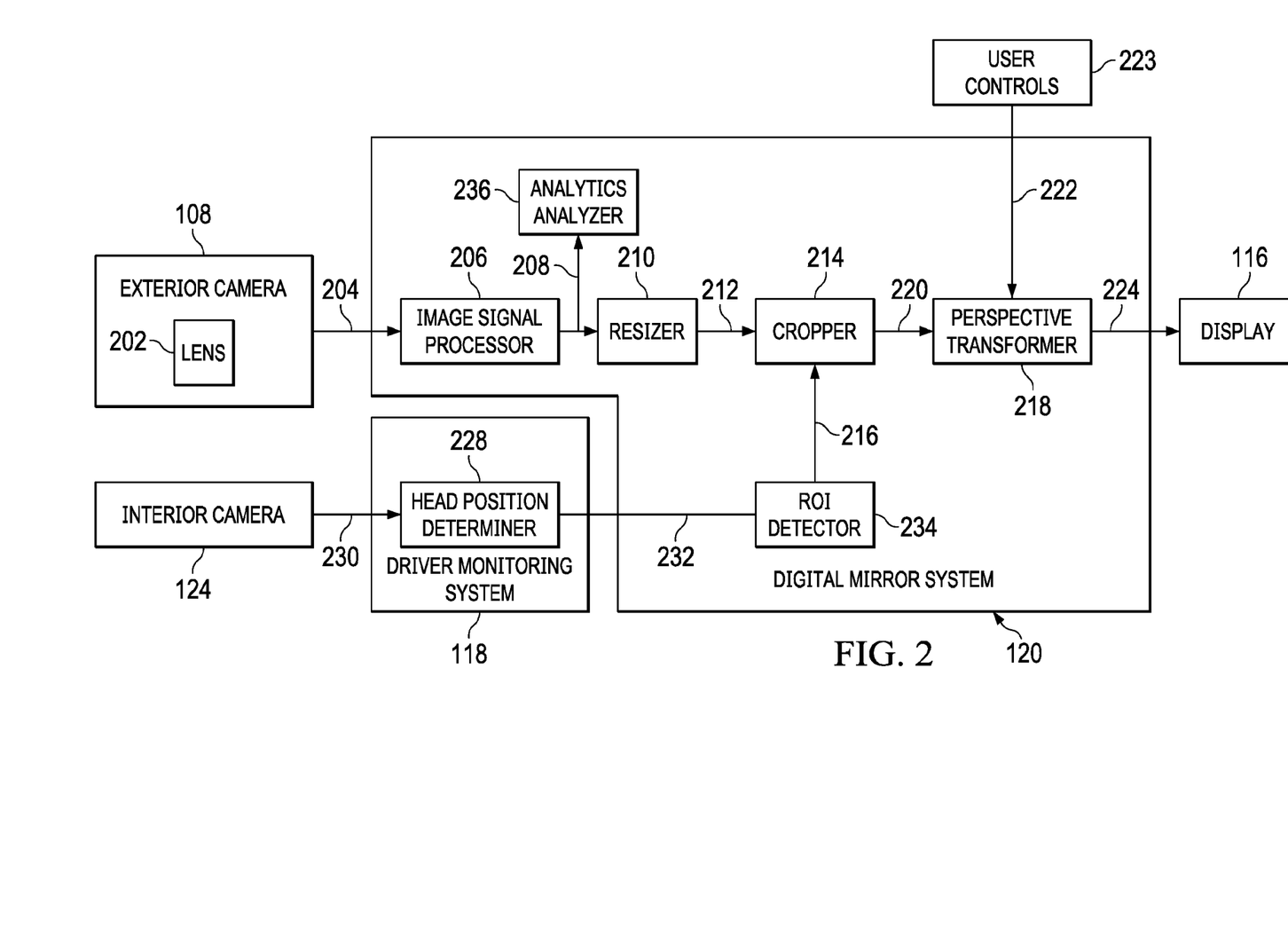
FIG. 2 is a block diagram illustrating example implementations of the example digital mirror system and the example driver monitoring system of FIG. 1.

FIG. 2 is a block diagram illustrating example implementations of the example driver monitoring system 118 and the example digital mirror system 120 of FIG. 1. To pre-process images 204 captured by the example exterior camera 108, the example digital mirror system 120 of FIG. 2 includes an example image signal processor 206. Using any number and/or type(s) of methods, algorithms, etc., the example image signal processor 206 of FIG. 2 processes the images 204 to, for example, reduce noise, adjust color balance, etc.

To resize images 208 output by the image signal processor 206, the example digital mirror system 120 of FIG. 2 includes an example resizer 210. Using any number and/or type(s) of methods, algorithms, etc., the example resizer 210 of FIG. 2 resizes the images 208 to have the same pixel density (e.g., 0.018 meters (m) per pixel) as the images captured by known digital mirror system cameras. For example, known digital mirror system cameras capture images that are 1280 pixels across a width of approximately 23 m (=2*20*tan(30 degrees)), which corresponds to 0.018 m per pixel (=23/1280). Some example digital mirror system cameras 108 disclosed herein capture images that are 1920 pixels across a width of approximately 33.5 m (=2*20*tan (40 degrees)), which corresponds to 0.0174 m per pixel (=33.5/1920). To obtain the same pixel density, the example resizer 210 of FIG. 2 resizes the images 208 output by the image signal processor 206 to be 1860 pixels across, which yields a pixel density of approximately 0.018 m per pixel (=33.5/1860). In some examples, other pixel densities are used. However, using the noted pixel density avoids objects appearing too small in the display 116. The additional pixels (580=1860−1280) provided by use of the disclosed example camera 108 enables the example portion 114 of FIG. 1 to be located at 580 different horizontal locations in the area 106. The different horizontal locations enable the portion 114 to be panned across the area 106 as the occupant moves their head 122. This panning occurs, in some examples, in real time.

To obtain portions of output images 212 of the resizer 210, the example digital mirror system 120 of FIG. 1 includes an example cropper 214. Based on cropping coordinates 216 of a portion of the area 106 (e.g., the portion 114), the example cropper 214 crops the images 212, retaining the portion of the images 212 corresponding to the cropping coordinates 216.

In some examples, the camera 108 cannot be rotated (e.g., moved left and right) and/or tilted (e.g., moved up and down), unlike traditional optical mirrors. To provide a virtual tilt and/or a virtual rotation for the camera 108, the example digital mirror system 120 includes an example perspective transformer 218. Using any number and/or type(s) of methods, algorithms, etc., the example perspective transformer 218 of FIG. 2 transforms images 220 output by the cropper 214 according to user control inputs 222. The user control inputs 222 may be provided using any number and/or type(s) of user control interface elements (e.g., a four-directional toggle switch to input tilt up, tilt down, tilt left, and tilt right). In some examples, the perspective transformer 218 performs other transforms or image processing including, but not limited to lens distortion correction, etc. In some examples, the perspective transformer 218 is implemented using a dedicated hardware accelerator such as the mesh warp hardware accelerator commercially available from TEXAS INSTRUMENTS™. The mesh warp hardware accelerator is a dedicated pixel re-map engine that is part of the imaging subsystem on several TDA3x and other TDAx devices manufactured by TEXAS INSTRUMENTS, and can be used to perform a variety of functions including lens distortion correction, fish-eye-distortion correction, perspective transform, multi-camera surround view application(s), etc. Outputs 224 of the perspective transformer 218 are presented at the display 116. Example mesh warp hardware accelerators that can be used to implement the example perspective transformer 218 are described in "TDA3x SoC for Advanced Driver Assistance Systems (ADAS), Silicon Revision 2.0, 1.0A, 1.0, Texas Instruments ADAS Family of Products, Technical Reference Manual" Literature Number: SPRUIE7A, June 2017—Revised October 2017, the entirety of which is incorporated herein by reference.

To determine the cropping coordinates 216, the example digital mirror system 120 of FIG. 2 includes the example driver monitoring system 118. Using any number and/or type(s) of methods, algorithms, etc., an example head position determiner 228 of the example driver monitoring system 118 processes images 230 captured by the interior camera 124 to determine data 232 representing iris recognition, face recognition, face detection and tracking, an occupant's head location, head orientation, eye gaze point, etc. Example technologies that may be used to implement the driver monitoring system 118 includes those described by FOTONATION® at www.fotonation.com.

An example ROI detector 234 of the example digital mirror system 120 of FIG. 2 processes the data 232 representing head location of the occupant's head, orientation of the head, eye gaze point of the head, etc. to determine where the occupant is looking, e.g., their gaze direction. In some examples, the ROI detector 234 performs ray tracing to determine the gaze direction, and identifies a region (e.g., a field of view) around (e.g., about, surrounding, encompassing, etc.) the gaze direction as the ROI 216. For example, the region around the gaze direction can be determined to be 1280 pixels wide (which is the number of pixels output by traditional digital mirror systems), and centered on the gaze direction. Example technologies that may be used to implement the ROI detector 234 include those described by FOTONATION® at www.fotonation.com.

In some examples, to perform additional, and/or alternative analysis, the example digital mirror system 120 includes an example analytics analyzer 236. Example analytics that can be performed by the example analytics analyzer 236 of FIG. 2 includes, but is not limited to, blind spot analysis. Because the FOV of the disclosed exterior camera 108 is wider than the camera used with traditional digital mirror systems, the example analytics analyzer 236 can detect and present more information to thereby reduce (e.g., eliminate) blind spots over a wider FOV, which can improve vehicular safety.

Figure 3A:
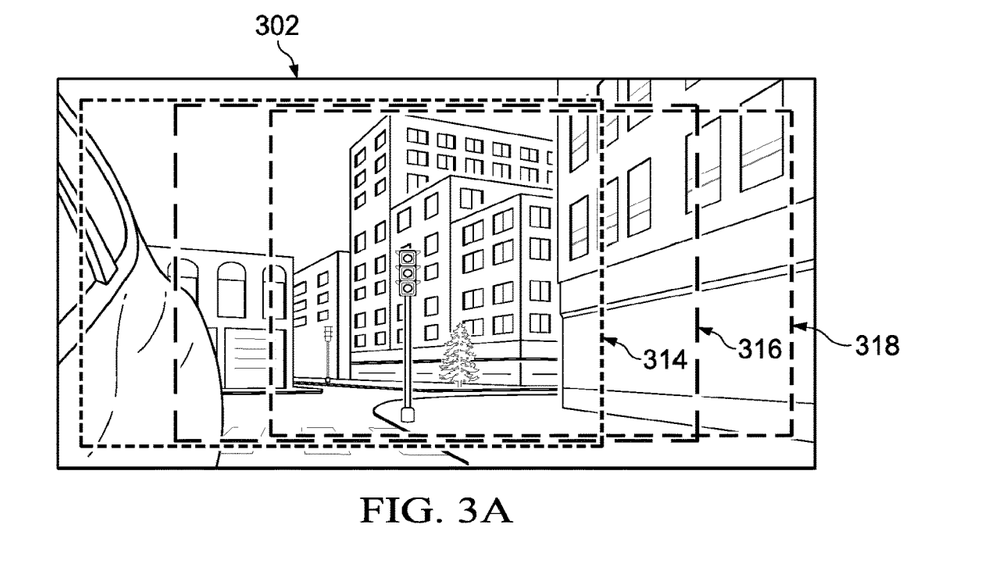
FIGS. 3A, 3B, 3C, 3C, 3D and 3E are example illustrations that together with illustrating an example operation of the example digital mirror system of FIGS. 1 and 2.
Figure 3B:
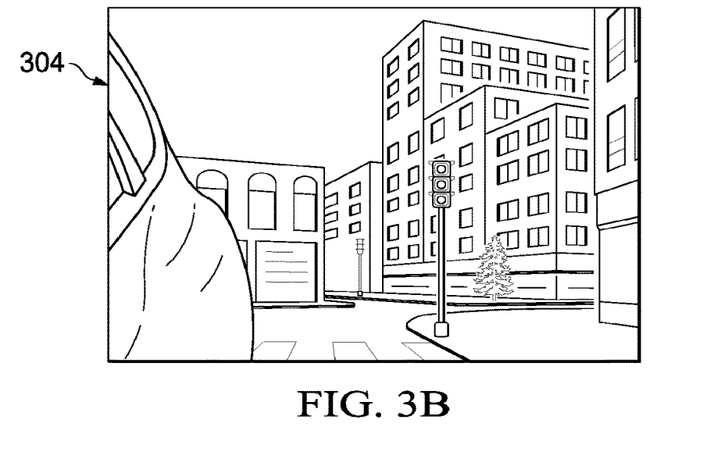
Figure 3C:
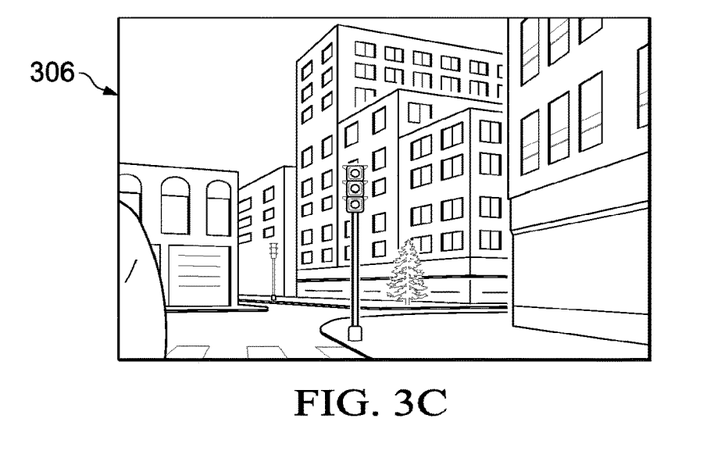
Figure 3D:
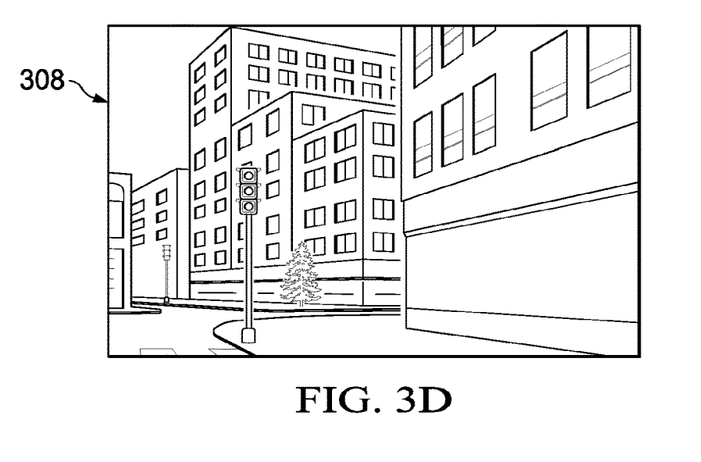
Figure 3E:
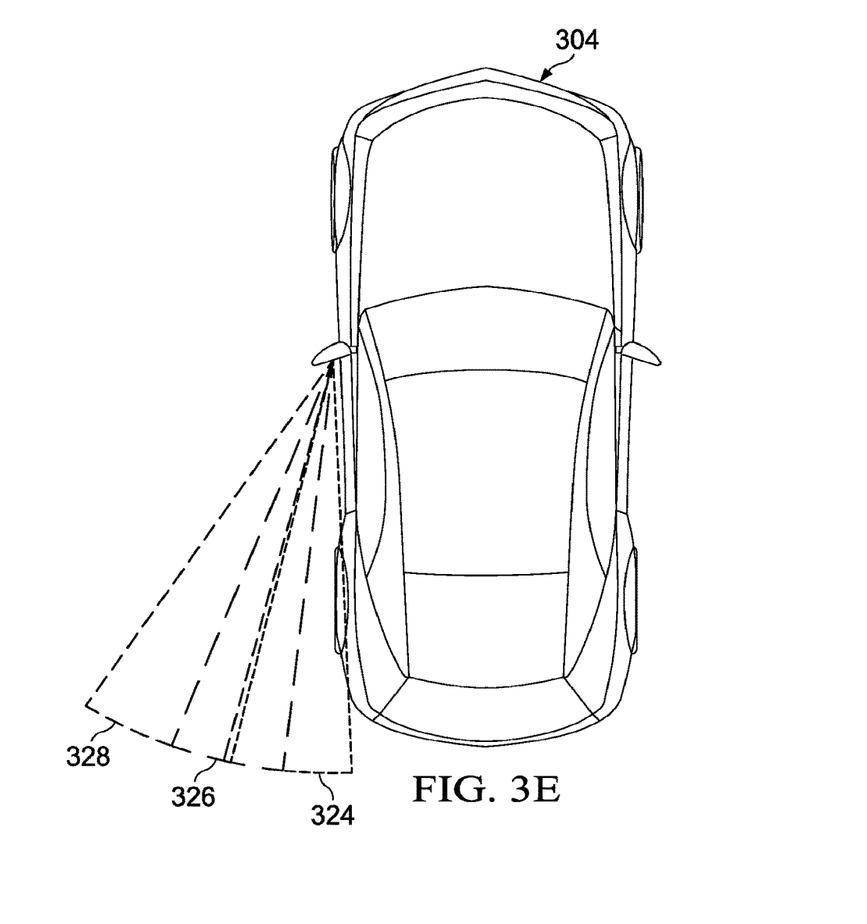

An example operation of the digital mirror system 120 of FIG. 2 will now be discussed in connection with example illustrations 302, 304, 306 and 308 respectively shown in FIGS. 3A, 3B, 3C and 3D. The example image 302 of FIG. 3A corresponds to the full FOV image 204 captured by the external or exterior camera 108 of FIG. 2 when a vehicle in which the digital mirror system 120 is stationary. The example images 304, 306 and 308 of respective FIGS. 3B-3D correspond to different respective crops 314, 316 and 318 of the example image 302. The crops 314, 316 and 318 correspond to different respective ROIs 324, 326 and 328 of FIG. 3E. The images 304, 306 and 308 of FIGS. 3B-3D are successively presented at the display 116 as an occupant moves their head and/or gaze away toward, for example, the virtual location of a virtual side-view optical mirror. As can be seen in FIGS. 3B-3D, what the occupant sees has panned outward from the side of the vehicle.

While an example manner of implementing the digital mirror system 120 of FIG. 1 is illustrated in FIG. 2, one or more of the elements, processes and/or devices illustrated in FIG. 2 may be combined, divided, re-arranged, omitted, eliminated and/or implemented in any other way. Further, the example image signal processor 206, the example resizer 210, the example cropper 214, the example perspective transformer 218, the example driver monitoring system 118, the example head position determiner 228, the example ROI detector 234, the example analytics analyzer 236 and/or, more generally, the example digital mirror system 120 of FIG. 2 may be implemented by hardware, software, firmware and/or any combination of hardware, software and/or firmware. Thus, for example, any of the example image signal processor 206, the example resizer 210, the example cropper 214, the example perspective transformer 218, the example driver monitoring system 118, the example head position determiner 228, the example ROI detector 234, the example analytics analyzer 236 and/or, more generally, the example digital mirror system 120 of FIG. 2 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example image signal processor 206, the example resizer 210, the example cropper 214, the example perspective transformer 218, the example driver monitoring system 118, the example head position determiner 228, the example ROI detector 234, the example analytics analyzer 236 and/or, more generally, the example digital mirror system 120 is/are hereby expressly defined to include a non-transitory computer readable storage device or storage disk such as a memory, a DVD, a CD, a Blu-ray disk, etc. including the software and/or firmware. Further still, the example digital mirror system 120 of FIG. 2 may include one or more elements, processes and/or devices in addition to, or instead of, those illustrated in FIG. 2, and/or may include more than one of any or all the illustrated elements, processes and devices.

Figure 4:
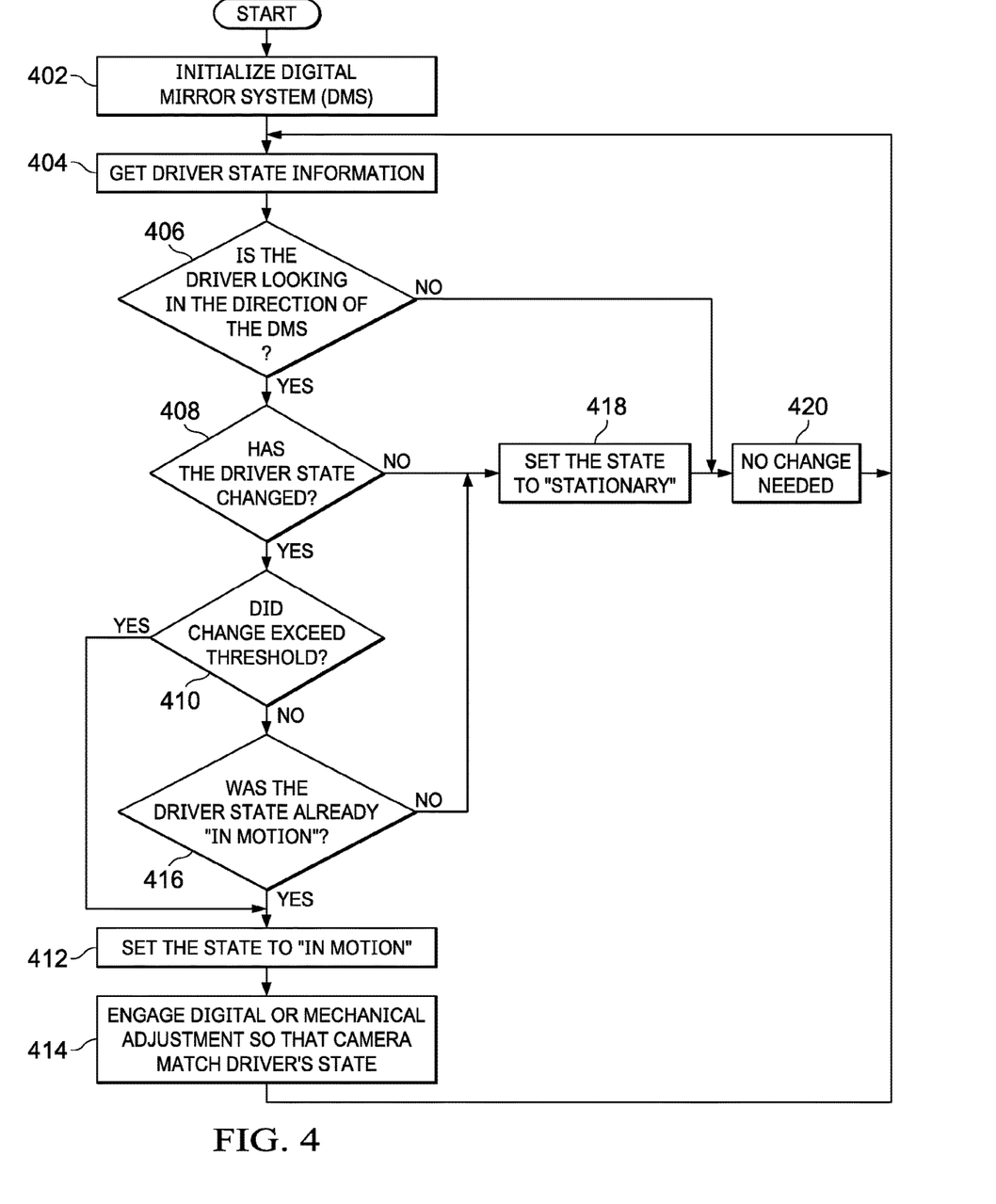
FIG. 4 is a flowchart representative of example machine-readable instructions that may be executed to implement the example digital mirror system of FIGS. 1 and 2.

A flowchart representative of example machine-readable instructions for implementing the digital mirror system 120 of FIGS. 1 and/or 2 is shown in FIG. 4. In this example, the machine-readable instructions comprise a program for execution by a processor such as the processor 512 shown in the example processor platform 500 discussed below in connection with FIG. 5. The program may be embodied in software stored on a non-transitory computer readable storage medium such as a CD, a floppy disk, a hard disk drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example digital mirror system 120 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using coded instructions (e.g., computer and/or machine-readable instructions) stored on a non-transitory computer and/or machine-readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program of FIG. 4 begins at block 402 with the digital mirror system 120 initializing the exterior camera 108, initializing the cropper 214 with a default starting ROI (e.g., a center area of the area 106 or a portion of 106 specified by a user preference), streaming images from the exterior camera 108 to the display 116 based on the default starting ROI, and starting the driver monitoring system 118 to provide periodic, and/or aperiodically, updates to the cropper 214 (block 402).

The head position determiner 228 periodically, and/or aperiodically, obtains information regarding an occupant's state (e.g., a driver's state) (block 404). For example, head location of the occupant's head, orientation of the head, eye gaze point of the head, etc. information can be collected from the images 230 gathered by the interior camera 124. If the driver is looking at the digital mirror system (e.g., toward the location of the interior camera 124) (block 406), the head position determiner 228 determines whether the driver's state (e.g., location and/or orientation) has changed (block 408). If the state change exceeds a threshold (block 410), the driver's state is set to "in motion" (block 412), and the ROI detector 234 begins determining ROIs that are used by the cropper 214 to crop images from the exterior camera 108, and the cropped images are presented at the display 116 (block 414).

If the state change does not exceed a threshold (block 410), and the driver is already in the "in motion" state (block 416), the driver remains in the "in motion" state (block 412. The ROI detector 234 continues determining ROIs that are used by the cropper 214 to crop images from the exterior camera 108, and the cropped images are presented at the display 116 (block 414).

Returning to block 416, if the driver was not already in the "in motion" state (block 416), the driver's state is set to "stationary" (block 418), new ROI's are not, or no longer, determined (block 420).

Returning to block 408, if the driver's state (e.g., location and/or orientation) has not changed (block 408), the driver's state is set to "stationary" (block 418), new ROI's are not, or no longer, determined (block 420).

Returning to block 406, if the driver is not looking at the digital mirror system (e.g., toward the location of the camera 124) (block 406), no changes to ROIs and driver state are made.

Figure 5:
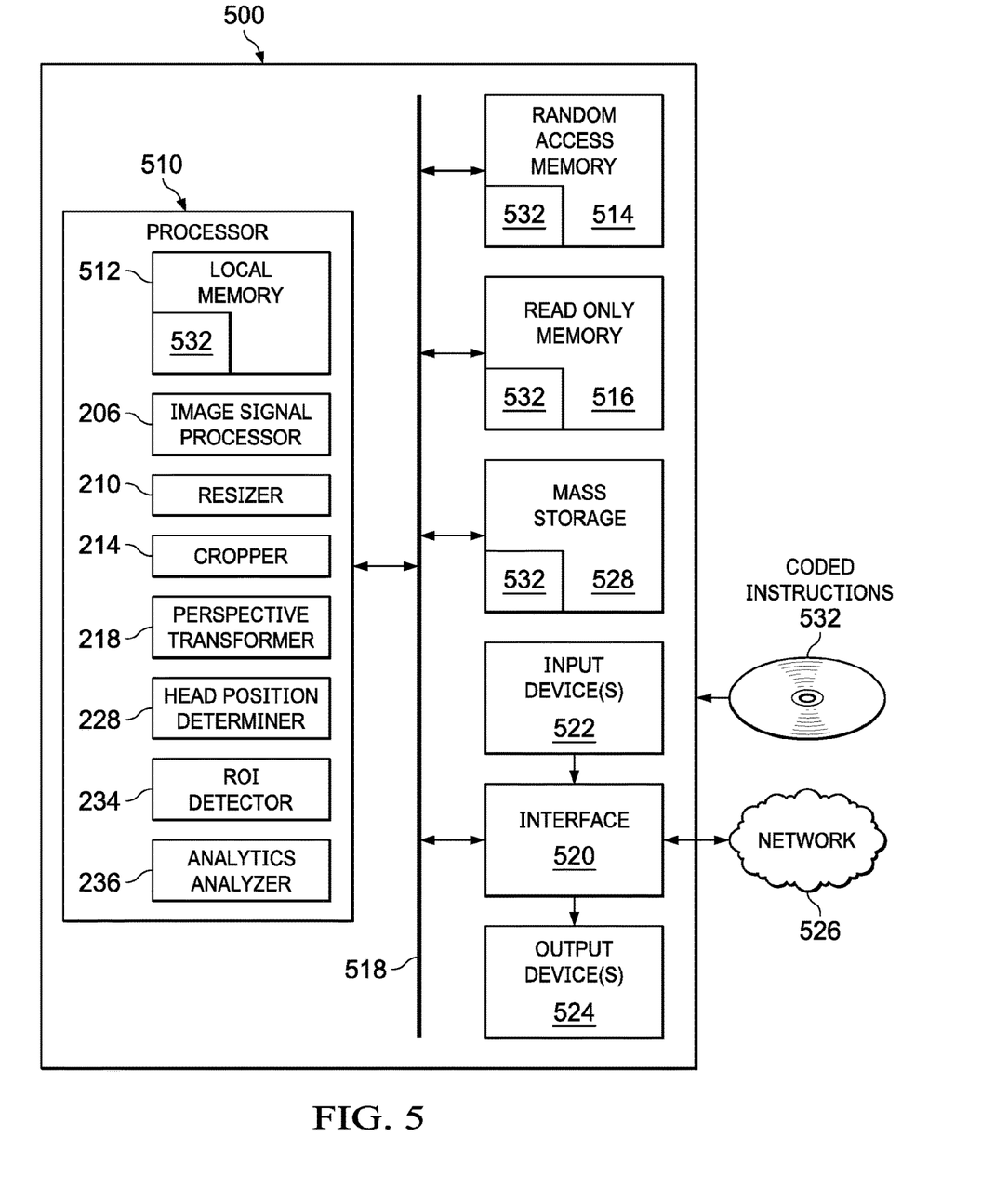
FIG. 5 illustrates an example processor platform structured to execute the example machine-readable instructions of FIG. 4 to implement the example digital mirror system of FIGS. 1 and/or 2.

FIG. 5 is a block diagram of an example processor platform 500 capable of executing the instructions of FIG. 4 to implement the digital mirror system 120 of FIGS. 1 and 2. The processor platform 500 can be, for example, a computer, a microcomputer, an embedded controller, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs or controllers from any desired family or manufacturer. The hardware processor may be a semiconductor based (e.g., silicon based) device. In this example, the processor implements the example image signal processor 206, the example resizer 210, the example cropper 214, the example perspective transformer 218, the example driver monitoring system 118, the example head position determiner 228, the example ROI detector 234, and the example analytics analyzer 236.

The processor 512 of the illustrated example includes a local memory 512 (e.g., a cache). The processor 512 of the illustrated example is in communication with a main memory including a volatile memory 514 and a non-volatile memory 516 via a bus 518. The volatile memory 514 may be implemented by Synchronous Dynamic Random-access Memory (SDRAM), Dynamic Random-access Memory (DRAM), RAMBUS® Dynamic Random-access Memory (RDRAM®) and/or any other type of random-access memory device. The non-volatile memory 516 may be implemented by flash memory and/or any other desired type of memory device. Access to the main memory 514, 516 is controlled by a memory controller (not shown).

The processor platform 500 of the illustrated example also includes an interface circuit 520. The interface circuit 520 may be implemented by any type of interface standard, such as a controller area network (CAN bus), an Ethernet interface, a universal serial bus (USB) interface, etc.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video) such as the cameras 108 and 124, a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices such as the display 116 (e.g., a light emitting diode (LED), an organic light emitting diode (OLED), a liquid crystal display (LCD), a cathode ray tube display (CRT), an in-plane switching (IPS) display, a touchscreen, etc.) a tactile output device, a printer, and/or speakers. The interface circuit 520 of the illustrated example, thus, typically includes a graphics driver card, a graphics driver chip and/or a graphics driver processor.

The processor platform 500 of the illustrated example may also include one or more mass storage devices 528 for storing software and/or data. Examples of such mass storage devices 528 include floppy disk drives, hard drive disks, CD drives, Blu-ray disk drives, redundant array of independent disks (RAID) systems, and DVD drives.

Coded instructions 532 including the coded instructions of FIG. 4 may be stored in the mass storage device 528, in the volatile memory 514, in the non-volatile memory 516, and/or on a removable tangible computer readable storage medium such as a CD or DVD.

Digital mirror systems for vehicles and methods of operating the same are disclosed herein. Further examples and combinations thereof include at least the following.

Example 1 is a vehicle control system including:
a driver monitoring system including a head position determiner to determine at least one of a location of a head, an orientation of the head, or an eye gaze point of the head;
a digital mirror system including
a region-of-interest (ROI) detector to identify an ROI based on the at least one of the location of the head, the orientation of the head, or the eye gaze point of the head, and
a cropper to extract a portion of a first image corresponding to the ROI to form a second image, the first image representing an area exterior to a vehicle; and
a display within an interior area of the vehicle to present the second image.

Example 2 is the vehicle control system of Example 1, wherein the driver monitoring system includes an interior camera to capture a third image of the head, the head position determiner is to determine at least one of the location of the head, the orientation of the head, or the eye gaze point of the head based on the third image, and the digital mirror system includes an exterior camera to capture the first image.

Example 3 is the vehicle control system of Example 2, further including:
a user control to enable a user to configure at least one of a virtual tilt of the exterior camera, or a virtual rotation of the exterior camera; and
a perspective transformer to modify the second image to mimic the least one of the virtual tilt of the exterior camera, or the virtual rotation of the exterior camera.

Example 4 is the vehicle control system of Example 1, wherein
the head position determiner is to determine a gaze direction based on the at least one of the location of the head, the orientation of the head, or the eye gaze point of the head, and
the ROI detector is to identify the ROI based on the gaze direction and a field-of-view around the gaze direction.

Example 5 is the vehicle control system of Example 4, wherein the gaze direction is associated with at least one of an operator of a vehicle, or a passenger of the vehicle.

Example 6 is the vehicle control system of Example 4, further including an analytics analyzer to detect an object in a blind spot based on the first image.

Example 7 is the vehicle control system of Example 1, wherein the ROI is at least one of external to the vehicle, internal to the vehicle, or partially external to the vehicle.

Example 8 is the vehicle control system of Example 1, wherein the digital mirror system updates what is presented on the display responsive to the head gazing toward the display.

Example 9 is the vehicle control system of Example 1, further including:
determining which digital mirror the occupant is gazing at;
updating what is presented on the display associated with the determined digital mirror in response to a detected change in at least one of the head position, the head angle or the eye gaze; and
not updating what is presented on a second display associated with a second digital mirror in response to the detected change.

Example 10 is a vehicle control system including:
an exterior camera to capture a first image of an area exterior to a vehicle;
an interior camera to capture a second image of an occupant of the vehicle;
a head position determiner to determine at least one of a location of a head, an orientation of the head, an eye gaze point of the head, or an orientation of a virtual optical mirror based on the second image;
a region of interest (ROI) detector to determine a gaze direction of the occupant in the vehicle based on the at least one of the location of the head, the orientation of the head, the eye gaze point of the head, or the orientation of the virtual optical mirror, and select a field-of-view around the gaze direction as an ROI;
a cropper to use a portion of the first image corresponding to the ROI to form a third image;
a user control to enable the occupant to configure at least one of a virtual tilt of the exterior camera, or a virtual rotation of the exterior camera;
a perspective transformer to modify the third image to mimic the at least one of the virtual tilt of the exterior camera, or the virtual rotation of the exterior camera to form a fourth image; and
a display to present the fourth image to an interior area of the vehicle.

Example 11 is the vehicle control system of Example 10, further including an analytics analyzer to detect an object in a blind spot based on the first image.

Example 12 is a method including:
determining, by executing an instruction with a processor, a gaze direction of an occupant of a vehicle;
identifying, by executing an instruction with a processor, a region-of-interest (ROI) based on the gaze direction;
extracting, by executing an instruction with a processor, a portion of an exterior image to form a cropped image, the portion corresponding to the ROI; and
presenting the cropped image to an interior of the vehicle.

Example 13 is the method of Example 12, further including:
receiving a user input representing at least one of a virtual tilt of a camera used to capture the exterior image, or a virtual rotation of the camera; and
modifying, by executing an instruction with a processor, the exterior image to mimic the least one of the virtual tilt of the camera, or the virtual rotation of the camera.

Example 14 is the method of Example 12, further including:
determining, by executing an instruction with a processor, the at least one of a location of a head, an orientation of the head, or an eye gaze point of the head based on an image taken of the occupant within the vehicle;

determining, by executing an instruction with a processor, a gaze direction based on the at least one of the location of the head, the orientation of the head, or the eye gaze point of the head; and identifying, by executing an instruction with a processor, the ROI based on the gaze direction and a field-of-view around the gaze direction.

Example 15 is the method of Example 14, further including:

identifying, by executing an instruction with a processor, an identity of the occupant based on the at least one of the gaze direction, the location of the head, the orientation of the head, or the eye gaze point of the head; and adapting how the cropped image is presented based on the identity.

Example 16 is a non-transitory computer-readable storage medium storing instructions that, when executed, cause a machine to:

determine a gaze direction of an occupant of a vehicle;

identify a region-of-interest (ROI) based on the gaze direction;

extract a portion of a first image taken of an area external to the vehicle to form a second image, the portion corresponding to the ROI; and present the second image to an interior of the vehicle.

Example 17 is the non-transitory computer-readable storage medium of Example 16, wherein the instructions, when executed, cause the machine to:

receive a user input representing at least one of a virtual tilt of a camera used to capture the first image, or a virtual rotation of the camera; and modify the first image to mimic the least one of the virtual tilt of the camera, or the virtual rotation of the camera.

Example 18 is the non-transitory computer-readable storage medium of Example 16, wherein the instructions, when executed, cause the machine to:

determining, by executing an instruction with a processor, the at least one of a location of a head, an orientation of the head, or an eye gaze point of the head based on an image taken of the occupant within the vehicle; and determining, by executing an instruction with a processor, a gaze direction based on the at least one of the location of the head, the orientation of the head, or the eye gaze point of the head; and identifying, by executing an instruction with a processor, the ROI based on the gaze direction and a field-of-view around the gaze direction.

"Including" and "comprising" (and all forms and tenses thereof) are used herein to be open ended terms. Thus, whenever a claim lists anything following any form of "include" or "comprise" (e.g., comprises, includes, comprising, including, having, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system, comprising:
a first camera configured to capture a first image data;
a second camera configured to capture a second image data;
a memory configured to store a state value, wherein the state value is one of stationary or in motion; and
a processor coupled to the first camera and the second camera, the processor configured to:
determine state information based on the first image data;
determine a change value based on the state information;
in response to the change value exceeding a threshold, identify a region of interest (ROI) based on the state information;
retrieve the state value from the memory;
in response to the state value being in motion and the change value not exceeding the threshold, update the ROI to correspond with the state information; and
extract a portion of the second image data based on the ROI as a displayed image.

2. The system of claim 1, further comprising:
the processor configured to set the ROI at a center area of a field of view of the second camera upon initialization.

3. The system of claim 1, further comprising:
in response to the change value not exceeding the threshold and the state value is not set to in motion, set the state value to stationary.

4. The system of claim 1, further comprising:
in response to the change value indicating no change in the state information, set the state value to stationary.

5. The system of claim 1, wherein:
the first image data includes a plurality of images captured sequentially in time.

6. The system of claim 1, wherein:
the processor is configured to determine the change value in response to information in the first image data indicating activation of the system.

7. The system of claim 1, further comprising:
an analyzer configured to detect objects in the second image data; and
the processor is configured to include information based on the objects in the displayed image.

8. The system of claim 1, further comprising:
the processor is configured to identify one or more occupants of a vehicle based on the state information.

9. A method comprising:
capturing a first image data with a first camera;
capturing a second image data with a second camera;
storing a state value in a memory, wherein the state value is one of stationary or in motion; and
determining, by a processor, state information based on the first image data;
determining, by the processor, a change value based on the state information;
in response to the change value exceeding a threshold, identifying, by the processor, a region of interest (ROI) based on the state information;
retrieving, by the processor, the state value from the memory;

in response to the state value being in motion and the change value not exceeding the threshold, updating, by the processor, the ROI to correspond with the state information; and extracting, by the processor, a portion of the second image data based on the ROI as a displayed image.

10. The method of claim 9, further comprising:
setting, by the processor, the ROI at a center area of a field of view of the second camera upon initialization.

11. The method of claim 9, further comprising:
in response to the change value not exceeding the threshold and the state value is not set to in motion, setting, by the processor, the state value to stationary.

12. The method of claim 9, further comprising:
in response to the change value indicating no change in the state information, setting, by the processor, the state value to stationary.

13. The method of claim 9, wherein:
the first image data includes a plurality of images captured sequentially in time.

14. The method of claim 9, wherein:
the processor is configured to determine the change value in response to information in the first image data indicating activation.

15. The method of claim 9, further comprising:
detecting, by an analyzer, objects in the second image data; and
including, by the processor, information based on the objects in the displayed image.

16. The method of claim 9, further comprising:
identifying, by the processor, one or more occupants of a vehicle based on the state information.

17. A system comprising
an interior camera of a vehicle;
a driver monitoring system coupled to the interior camera, wherein the driver monitoring system includes a head position detector, wherein the driver monitoring system is configured to determine, from data provided by the interior camera, occupant viewing information based on one or more of a location for a head of an occupant, orientation of the head, and an eye gaze point of the head;
an exterior camera of the vehicle configured to capture an image; and
a digital mirror system coupled to the exterior camera and the driver monitoring system, wherein the digital mirror system is configured to:
receive the occupant viewing information;
determine a state value and a change value based on the occupant viewing information;
store the state value in a memory, wherein the state value is one of stationary or in motion;
in response to the change value exceeding a threshold, identifying a region of interest (ROI) based on the occupant viewing information;
in response to the state value being in motion and the change value not exceeding the threshold, updating the ROI to correspond with the occupant viewing information; and
extract a portion of the image from the exterior camera based on the ROI as a displayed image.

18. The system of claim 17, wherein:
the digital mirror system includes an analyzer configured to detect objects in the image; and
the digital mirror system configured to include information based on the objects in the displayed image.

19. The system of claim 17, wherein:
the digital mirror system is configured to identify one or more occupants of the vehicle based on the occupant viewing information.

20. The system of claim 17, wherein:
the driver monitoring system is configured to determine, from the occupant viewing information, that the occupant is looking at the displayed image.

* * * * *